United States Patent
Little

(10) Patent No.: US 8,396,806 B2
(45) Date of Patent: Mar. 12, 2013

(54) END USER LICENSE AGREEMENTS ASSOCIATED WITH MESSAGES

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1013 days.

(21) Appl. No.: 11/980,856

(22) Filed: Oct. 30, 2007

(65) Prior Publication Data

US 2009/0112771 A1     Apr. 30, 2009

(51) Int. Cl.
*G06F 21/00* (2006.01)
(52) U.S. Cl. ............ 705/59; 726/6; 726/7; 726/18; 726/19; 726/30; 707/785; 707/806; 707/707; 707/710; 717/102; 717/103; 715/239; 715/744; 709/225; 709/229
(58) Field of Classification Search ............ 709/225, 709/229; 705/59; 726/6, 7, 18–19, 30; 715/239, 715/744; 717/102–103
See application file for complete search history.

(56) References Cited

U.S. PATENT DOCUMENTS

| | | | |
|---|---|---|---|
| 4,739,759 A | 4/1988 | Rexroth et al. | |
| 5,159,929 A | 11/1992 | Morris et al. | |
| 5,400,267 A | 3/1995 | Denen et al. | |
| 5,617,857 A | 4/1997 | Chader et al. | |
| 5,749,869 A | 5/1998 | Lindenmeier et al. | |
| 5,878,431 A * | 3/1999 | Potterveld et al. | 707/694 |
| 6,117,126 A | 9/2000 | Appelbaum et al. | |
| 6,162,216 A | 12/2000 | Guziak et al. | |
| 6,370,411 B1 | 4/2002 | Osadchy et al. | |
| 6,432,065 B1 | 8/2002 | Burdorff et al. | |
| 6,632,183 B2 | 10/2003 | Bowman et al. | |
| 6,652,520 B2 | 11/2003 | Moorman et al. | |
| 7,047,488 B2 * | 5/2006 | Ingersoll et al. | 715/235 |
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,200,674 B2 * | 4/2007 | Sapuram et al. | 709/238 |
| 2002/0077565 A1 | 6/2002 | Burdorff et al. | |
| 2002/0198519 A1 | 12/2002 | Qin et al. | |
| 2003/0005427 A1 * | 1/2003 | Herrero | 717/178 |
| 2003/0033240 A1 * | 2/2003 | Balson et al. | 705/37 |
| 2003/0130711 A1 | 7/2003 | Pearson et al. | |
| 2003/0144605 A1 | 7/2003 | Burbank et al. | |
| 2003/0181898 A1 | 9/2003 | Bowers | |

(Continued)

FOREIGN PATENT DOCUMENTS

| | | |
|---|---|---|
| DE | 37 03 218 | 8/1988 |
| EP | 0 225 973 | 6/1987 |

(Continued)

OTHER PUBLICATIONS

Richards, M. "The Role of the Enterprise Service Bus." Presentation presented on Oct. 23, 2006. http://www.infoq.com/presentations/Enterprise-Service-Bus.*

(Continued)

*Primary Examiner* — Calvin Cheung
(74) *Attorney, Agent, or Firm* — Lowenstein Sandler LLP

(57) ABSTRACT

A message that includes an end user license agreement is received at a client from a service in a distributed computing system. The client determines whether to accept the end user license agreement. The message is processed if the end user license agreement is accepted.

21 Claims, 9 Drawing Sheets

U.S. PATENT DOCUMENTS

| | | | |
|---|---|---|---|
| 2003/0220883 A1* | 11/2003 | Block et al. .................... 705/59 |
| 2004/0030334 A1 | 2/2004 | Quick et al. |
| 2004/0082945 A1 | 4/2004 | Clague et al. |
| 2004/0172017 A1 | 9/2004 | Marion et al. |
| 2004/0181219 A1 | 9/2004 | Goble et al. |
| 2005/0005116 A1* | 1/2005 | Kasi et al. .................... 713/170 |
| 2005/0033588 A1* | 2/2005 | Ruiz et al. .................... 705/1 |
| 2005/0119646 A1 | 6/2005 | Scholl et al. |
| 2005/0289072 A1* | 12/2005 | Sabharwal .................... 705/59 |
| 2007/0271275 A1* | 11/2007 | Fassette et al. .................... 707/10 |
| 2008/0104615 A1* | 5/2008 | Nolan et al. .................... 719/328 |

FOREIGN PATENT DOCUMENTS

| | | |
|---|---|---|
| EP | 1 053 720 | 11/2000 |
| EP | 1 082 945 | 3/2001 |
| EP | 1 157 667 | 11/2001 |
| EP | 1 519 472 | 3/2005 |
| EP | 1 527 743 | 5/2005 |
| GB | 2 146 534 | 4/1985 |
| JP | 2002 320325 | 10/2002 |
| WO | WO 93/15655 | 8/1993 |
| WO | WO 96/39088 | 12/1996 |
| WO | WO 98/07378 | 2/1998 |
| WO | WO 98/14129 A | 4/1998 |
| WO | WO 02/24082 | 3/2002 |
| WO | WO2004027548 A2 * | 4/2004 |
| WO | WO2004027618 A1 * | 4/2004 |
| WO | WO 2004/110294 | 12/2004 |
| WO | WO 2005/060849 | 7/2005 |

OTHER PUBLICATIONS

Chappell, D. "Enterprise Service Bus." Jun. 2004. O'Reilly Media, Inc. All Pages. Retrieved from Safari Books online.*

"JBossESB Requirements and Architecture, Version: 0.3," May 2, 2006, pp. 1-12.

OASIS, "Web Services Context Specification (WS-Context)," OASIS Committee draft version 0.8, Version created Nov. 3, 2004, Editors, Mark Little, et al., Copyright © 2004 The Organization for the Advancement of Structured Information Standards [Appendix A], pp. 1-23.

Van Hu Izen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Why ESB and SOA?" Version 0.3, Date: Jan. 27, 2006, pp. 1-7.

"JBoss Transactions 4.2.3, JTS Programmers Guide", © 2006, 117 pages.

Johnson, Rod, et al., "Spring java/j2ee Application Framework, The Spring Framework—Reference Documentation", Version 2.5.6, © 2004-2008, 590 pages.

King, Erik, "Perpetual Enterprise Management Service (PEMS) for Next Generation SOA-based Command & Control Systems", Jun. 2005, 26 pages.

King, Erik, "Perpetual Enterprise Management Service (PEMS) for C2 SOA Deployments", Jun. 14, 2005, 23 pages.

* cited by examiner

END USER LICENSE AGREEMENTS ASSOCIATED WITH MESSAGES

TECHNICAL FIELD

Embodiments of the present invention relate to distributed computing, and more specifically to associating end user license agreements with messages in a distributed computing environment.

BACKGROUND

In conventional distributed computing systems, received messages are added to a queue, and are automatically executed once they reach the head of the queue. Clients and services may include sets of rules that determine how to interpret the messages, how to process the messages, and so on. For example, when a service receives messages from a first client, it may apply rule A to perform a first action, and when the service receives messages from a second client, it may apply rule B to perform a second action. If a received message is in a format that cannot be interpreted by the recipient, then it is not processed. However, such conventional distributed computing systems do not include a mechanism for establishing a contractual arrangement associated with the messages before those messages are processed.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
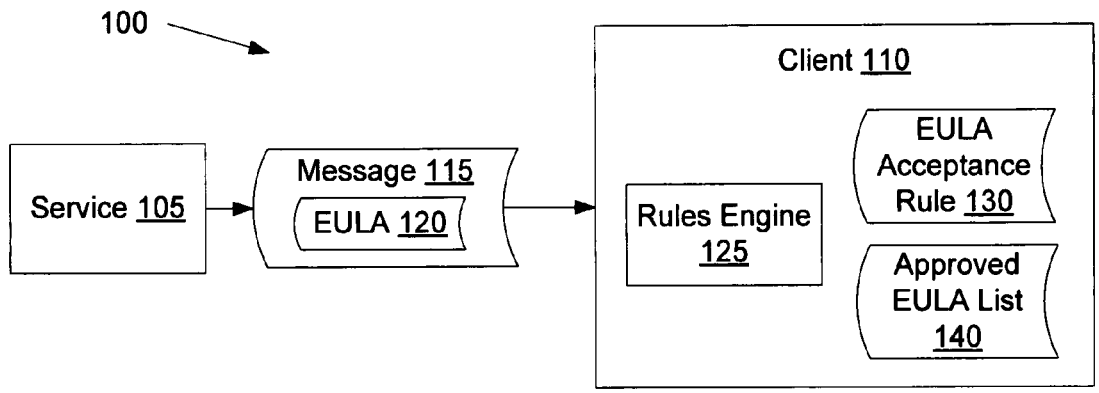
FIG. 1A illustrates a data flow diagram showing a message flowing through a distributed computing system, in accordance with one embodiment of the present invention.

Described herein is a method and apparatus for associating end user license agreements with messages in a distributed computing system. In one embodiment, a message that includes an end user license agreement is received at a client from a service in a distributed computing system. The client determines whether to accept the end user license agreement. In one embodiment, the end user license agreement is compared to a list of approved end user license agreements. If the end user license agreement matches an approved end user license agreement on the list, the end user license agreement is accepted without user input. If the end user license agreement does not match an approved end user license agreement on the list, the end user license agreement is presented to a user for approval. The message is processed if the end user license agreement is accepted. In one embodiment, an accept response message is sent to a service from which the message was received upon acceptance of the end user license agreement. A second message may then be received from the service.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "presenting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 2:
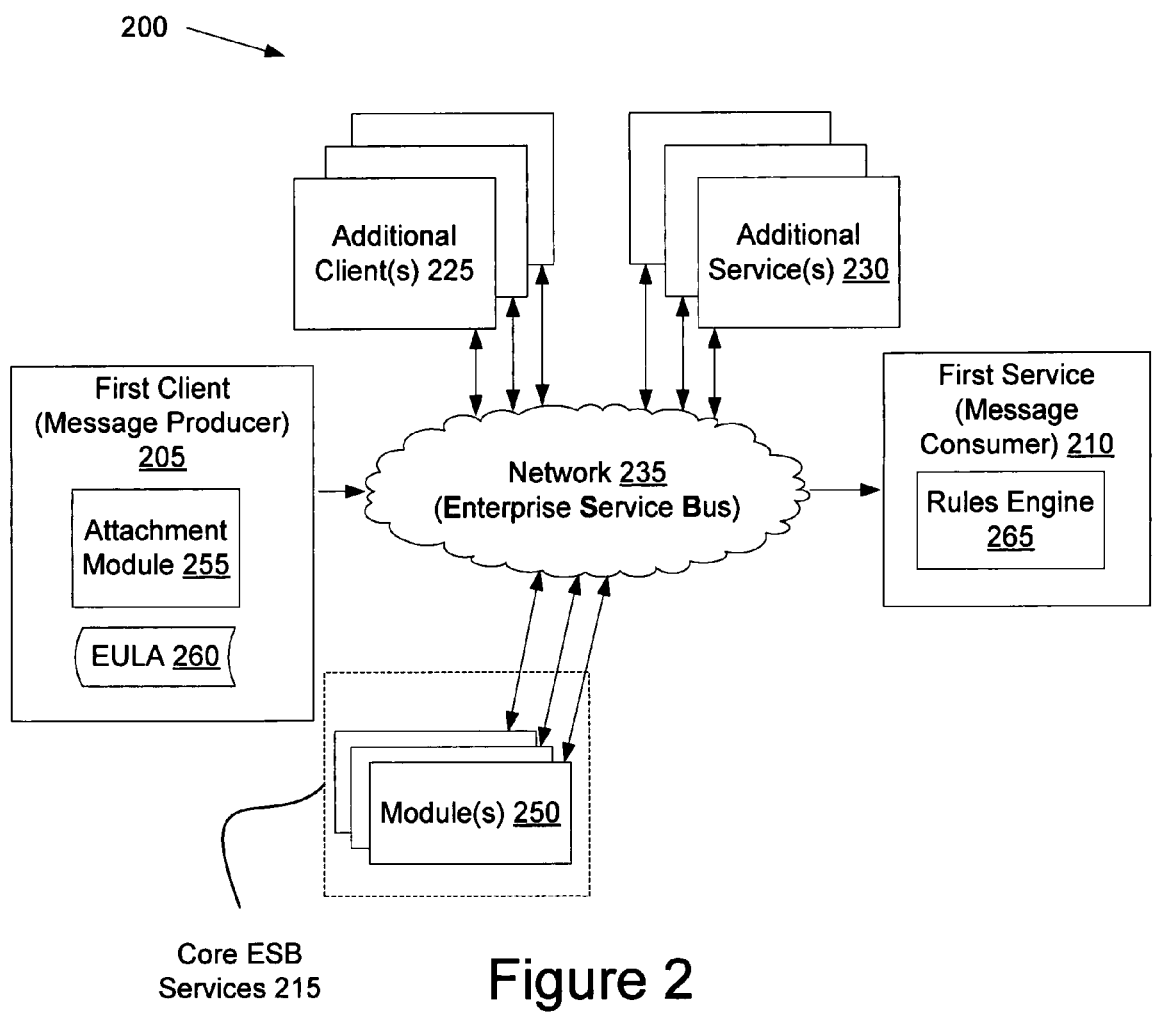
FIG. 2 illustrates an exemplary distributed computing system, in which embodiments of the present invention may operate.

FIG. 1A illustrates a data flow diagram 100 showing a message flowing through a distributed computing system, in accordance with one embodiment of the present invention. In one embodiment, the distributed computing system is implemented as a database management system. In other embodiments, the distributed computing system is implemented as a service oriented architecture (SOA) and/or as an enterprise service bus (ESB). An exemplary distributed computing system is illustrated in FIG. 2 below.

Returning to FIG. 1A, a service 105 generates a message 115 and transmits it to a client 110 through the distributed computing system. Service 105 may be a discretely defined set of contiguous and autonomous functionality (e.g., business functionality, technical functionality, etc.). Service 105 may be resident on personal computers (PC), servers, routers, etc. Service 105 may represent a process, activity or other resource that can be accessed and used by other services or clients within the distributed computing system. Service 105 may be independent of other services (not shown), and may be accessed without knowledge of its underlying platform implementation.

The message 115 may include data that may convey information to, or initiate an event on, client 110. The message 115 may be generated for any of a myriad of purposes. For example, the message 115 may be generated to report a purchase of a good, to request contact information, to report a result of a remote process, initiate a remote process, etc.

In one embodiment, message 115 includes a message header, a message context, and a message body. The message header may include a unique message identifier and routing information (e.g., recipient, sender, message priority, etc.). The message header may be used to identify the message 115, and to route the message 115 to end points (recipients) intended by service 105, or to other end points determined by the distributed computing system. The message 115 may be directed to a specific endpoint (e.g., client 110). Alternatively, the message 115 may be posted to an intermediate location, which one or more endpoints may communicate with to receive the message 115.

The message context may include properties that support compatibility between service 105 and client 110. The message context may provide, for example, custom fields or filters, transactional information (e.g., to identify a distributed transaction or session associated with the message), security information (e.g., authorization information, authentication information, etc.), and so on.

The message body may include data to which a client 110 may respond (e.g., by initiating an event). The content and configuration (layout) of the message body may determine a message type. Examples of message types include text messages, map messages, bytes messages, stream messages and object messages. Other message types are also possible. In one embodiment, the message body is formatted using an extensible markup language (XML). Use of XML allows flexible information formats to be implemented. Other flexible information formats, such as standard generalized markup language (SGML) may also be used for the message body.

In one embodiment, the message 115 includes an end user license agreement (EULA) 120. The EULA 120 is a software license agreement that dictates contract terms that the client 110 must accept before utilizing the message 115. The EULA 120 gives the client 110 an option of accepting or rejecting the license agreement. If the EULA 120 is rejected, the message cannot be processed. If the EULA 120 is accepted, the message 115 can be processed.

Client 110 may be, for example, a personal computer (PC), palm-sized computing devices, personal digital assistants (PDA), etc. Client 110 may also be an application run on a PC, server, database, etc. In a service oriented environment (SOA), client 110 includes an application that accesses services (e.g., service 105). Client 110 may be a fat client (client that performs local processing and data storage), a thin client (client that performs minimal or no local processing and minimal to no data storage), or a hybrid client (client that performs local processing but little to no data storage).

In one embodiment, client 110 includes a rules engine 125, an end user license agreement (EULA) acceptance rule 130, and an approved EULA list 140. The rules engine 125 is a logic component that processes rules (e.g., EULA acceptance rule 130) to produce outcomes. The rules engine 125 may match facts, data and rules, and infer conclusions which may result in actions or events of, for example, the client 110. In one embodiment, the rules engine 125 matches the facts, data and rules using a Rete Algorithm. Alternatively, the rules engine 125 may use a Linear Algorithm, Treat Algorithm, Leaps Algorithm, etc. Hybrid algorithms that use combinations of, for example, the Leaps Algorithm and the Rete Algorithm, may also be used.

Upon client 110 receiving message 115, the rules engine 125 processes the EULA acceptance rule 130. In one embodiment, message 115 notifies rules engine 125 that the EULA acceptance rule 130 should be processed. Alternatively, rules engine 125 may determine that the EULA acceptance rule 130 should be processed upon detecting a EULA attached to message 115.

EULA acceptance rule 130 may include conditional elements (e.g., and, or, not, exists, etc.), constraints (e.g., equal to, not equal to, greater than, contains, etc.) and consequences or actions (e.g., decrypt message, process next rule, etc.). The EULA acceptance rule 130 provides instructions on how and whether to process message 115 based on one or more of the EULA 120, user input, and approved EULA list 140. A determination on how and whether to process message 115 may also depend on a message body, message header, and/or message context of the message 115. Other facts and data may also be used in making the determination.

The approved EULA list 140 is a list of end user license agreements that have been previously approved for client 110. In one embodiment, approved EULA list 140 includes EULAs that have been approved by a legal department of a business (or other legal entity) that manages or owns client 110. Alternatively, the approved EULA list 140 may include EULAs that have previously been accepted by a user or administrator of client 110 instead of, or in addition to, EULAs that have been approved by a legal department. In a further embodiment, EULAs are added to the approved EULA list 140 after they have been accepted a specified number of times (e.g., after a specific EULA is accepted by a user 5 times, 10 times, etc.).

In one embodiment, the EULA acceptance rule 130 compares the EULA 120 to the approved EULA list 140. If the EULA 120 matches an entry on the approved EULA list 140, the rules engine 125 may automatically add the message 115 to a process queue. The message 115 is then processed by client 110. If the EULA does not match an entry in the approved EULA list 140, a user may be prompted to accept the EULA 120. The user may be prompted via a graphical user interface (not shown), and may accept or decline the EULA 120 via an input device (not shown).

Figure 1B:
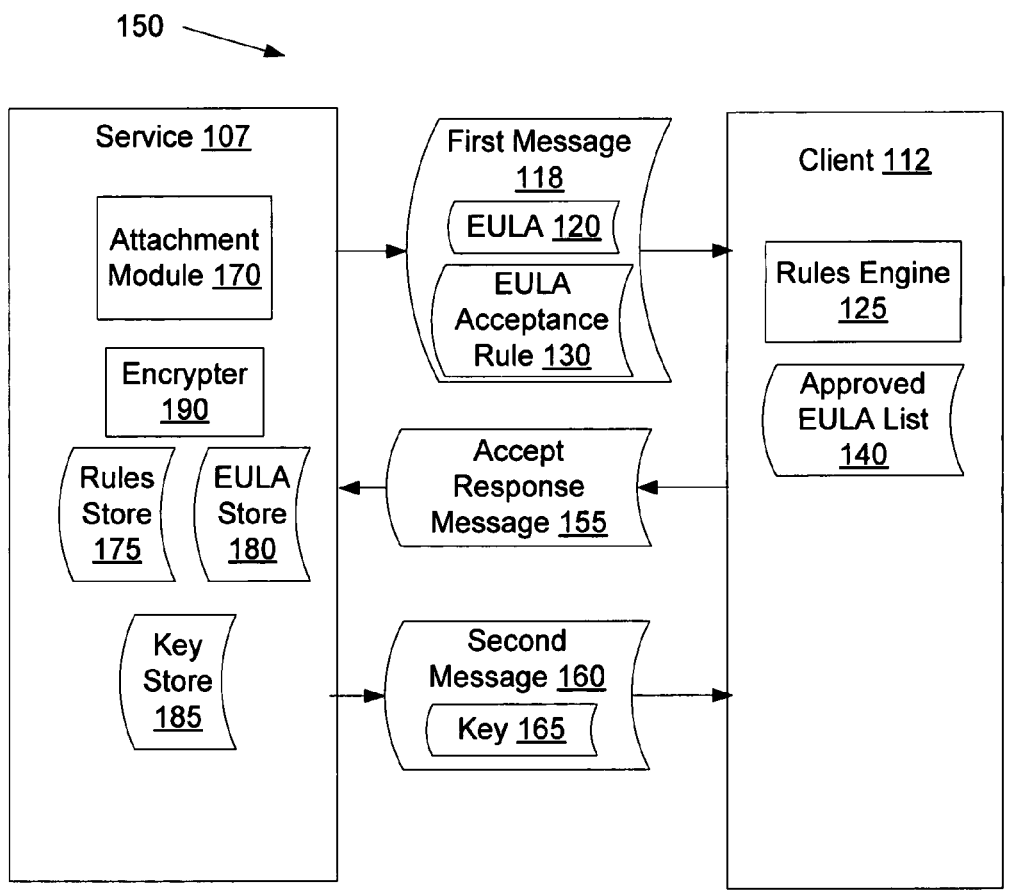
FIG. 1B illustrates a data flow diagram showing a message flowing through a distributed computing system, in accordance with another embodiment of the present invention.

FIG. 1B illustrates a data flow diagram 150 showing a message flowing through a distributed computing system, in accordance with another embodiment of the present invention. An exemplary distributed computing system is illustrated in FIG. 2 below.

Returning to FIG. 1B, a service 107 generates a first message 118 and transmits it to a client 112 through the distributed computing system. In one embodiment, the service 107 includes an attachment module 170, a rules store 175, a EULA store 180, a key store 185 and an encrypter 190.

In one embodiment, encrypter 190 encrypts the first message 118 such that it can only be decrypted by clients or services that possess an encryption key that was used to perform the encryption. The encryptor 190 may encrypt the first message using conventional encryption algorithms, such as, for example, data encryption standard (DES) or advanced encryption standard (AES). Thereby, service 107 may ensure that message 118 can only be processed if the EULA 120 is accepted.

In one embodiment, attachment module 170 associates EULA acceptance rule 130 and EULA 120 with message 118 before sending message 118 to client 112. Alternatively, attachment module 170 may only associate EULA 120 with the message 118. Attachment module 170 associates rules (e.g., EULA acceptance rule 130), EULAs (e.g., EULA 120) and/or encryption keys (e.g., key 165) with messages (e.g., first message 118 and second message 160). To determine which rules, EULAs and/or encryption keys to associate with which messages, attachment module 170 may analyze the message (e.g., to determine a client or service to which the message is directed, to determine a message type and/or message context, etc.), and may examine available rules, EULAs and encryption keys. In one embodiment, associating EULA acceptance rule 130 and EULA 120 with first message 118 includes attaching them to the first message 118. Alternatively, associating the EULA acceptance rule 130 and/or EULA 120 with first message 118 may include placing one or more of the rule or the EULA in the body of first message 118.

In one embodiment, rules (e.g., EULA acceptance rule 130) are stored in rules store 175. Likewise, in an embodiment, EULAs are stored in EULA store 180 and encryption keys are stored in key store 185. Each of the rules store 175, EULA store 180 and key store 185 may include a repository or database in which rules, EULAs or keys (as appropriate) may be managed, organized, searched, etc. Rules store 175, EULA store 180 and key store 185 may include storage devices such as RAM, hard disk drives, optical drives, etc.

Rules store 175, EULA store 180 and key store 185 may include a single storage device, or multiple networked storage devices at the same or different locations. In one embodiment, rules store 175, EULA store 180 and key store 185 are located at service 107. In another embodiment, one or more of rules store 175, EULA store 180 and key store 185 may be external to service 107.

In one embodiment, the first message 118 includes an end user license agreement (EULA) 120 and a EULA acceptance rule 130, which may be attached to, or included in a message body of, the first message 118.

Upon client 112 receiving first message 118, a rules engine 125 processes the EULA acceptance rule 130 included in first message 118. Alternatively, rules engine 125 may process a EULA acceptance rule stored at client 112. By processing the EULA acceptance rule 130, rules engine 125 determines whether to accept or reject EULA 120 (e.g., based on an approved EULA list 140, user input, etc.). If the EULA 120 is accepted, client 112 generates an accept response message 155 and transmits it to service 107.

Upon receiving the accept response message 155, service 107 generates a second message 160, and transmits it to client 112. In one embodiment, the second message 160 includes data that permits first message 118 to be processed. For example, second message 160 may include necessary instructions that, when added to instructions included in first message 118, permit a transaction to be executed. Alternatively, second message may include an encryption key (e.g., key 165) that can be used to decrypt the first message 118 to permit first message 118 to be processed. In such an example, attachment module 170 associates an encryption key (e.g., key 165) with the second message 160, as illustrated. In another embodiment, the first message 118 is a preliminary message that does not include instructions to be processed other than the EULA 120 and/or the EULA acceptance rule 130. In such an embodiment, the second message 160 includes instructions to execute the transaction for which a legal contract was established in the first message 118.

In one embodiment, in which the first message 118 is encrypted, client 112 uses encryption key 165 to decrypt first message 118 upon receiving the second message 160. First message 118 is then processed. In another embodiment, in which the first message 118 is a preliminary message, second message 160 is processed upon receipt of the second message 160. Alternatively, both first message 118 and second message 160 may be processed upon receiving second message 160. First message 118 and second message 160 may be combined and processed together, or may be processed separately.

Though the embodiments of the present invention shown in FIGS. 1A and 1B are described such that a service generates a message, attaches a EULA to the message, etc., and a client receives the message, determines whether to accept the EULA, etc., the roles of the client and the service may be reversed. For example, the client may generate a message, attach a EULA to the message, and send it to the service. Likewise, the service may receive the message, determine whether to accept the EULA, and process the message.

FIG. 2 illustrates an exemplary distributed computing system 200, in which embodiments of the present invention may operate. In one embodiment, the distributed computing system 200 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 200 may include clients (e.g., first client 205 and additional clients 225) and services (e.g., first service 210, additional services 230 and core ESB services 215), connected via a network 235. Each of the clients 205 and 225 and services 210, 215, 230 may be both message producers and message consumers, as described below. Moreover, each of the clients 205, 225 and services 210, 215, 230 may associate EULAs with messages. Thereby, contractual relationships may be formed with some or all messages generated by message producers and processed by message consumers.

The network 235 may be a public network (e.g., Internet), a private network (e.g., Ethernet or a local area Network (LAN)), or a combination thereof. In one embodiment, the network 235 includes an enterprise service bus (ESB). An ESB is an event-driven and standards-based messaging engine that provides services for more complex architectures. The ESB provides an infrastructure that links together services 210, 215, 230 and clients 205 and 225 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In the illustrated embodiment, the first client 205 is a message producer. Alternatively, additional clients 225, first service 210, additional services 230 or core ESB services 215 may be message producers. A message producer is a client or service that generates a message. Messages include data that may convey information to, or initiate an event on, a message consumer (e.g., a service or client). A message may be generated for any of a myriad of purposes. For example, the message may be generated to report a purchase of a good, to request contact information, to begin a remote process (e.g., initiate a service), etc.

First client 205 includes an attachment module 255 and an end user license agreement 260. In one embodiment, attachment module 255 associates EULA 260 with some or all messages generated by first client 205.

In the illustrated embodiment, the first service 210 is a message consumer. Alternatively, first client 205, additional clients 225, core ESB services 215 or additional services 230 may be message consumers. A message consumer receives a message generated by a message producer, and sent to an address (e.g., service address or client address) of the message consumer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc. In one embodiment, message consumers must accept EULAs associated with received messages before the messages can be processed by the message consumer.

First service 210 includes a rules engine 265. When a message is received from first client that has a EULA associated with it, rules engine processes one or more rules (e.g., a EULA acceptance rule) to determine whether to accept the EULA. If the EULA is accepted, first service processes the received message. If the EULA is not accepted, the received message associated with the EULA is not processed.

In one embodiment, the distributed computing system 200 includes an ESB that has a collection of core ESB services 215. The core ESB services 215 act on messages that flow through the ESB. Messages can also be directed towards any of the core ESB services 215 in the same manner as described above with reference to the first service 210 and additional services 230. Any of the core ESB services 215 may include one or more general purpose computing devices (e.g., personal computer or server) and/or special purpose computing devices configured to act on messages that flow between message producers (e.g., clients or services) and message consumers (e.g., clients or services) within the ESB.

The core ESB services 215 may include one or more modules 250, each of which may be a service of the ESB. Examples of modules 250 include modules that provide services for splitting a message into multiple messages, routing messages, combining multiple messages into a single message, transforming messages from a first format to a second format, applying rules to a message, storing copies of messages, etc. Each module 250 may provide a service to clients 205 and 225 and/or services 210 and 230 of the distributed computing system 200.

Figure 3:
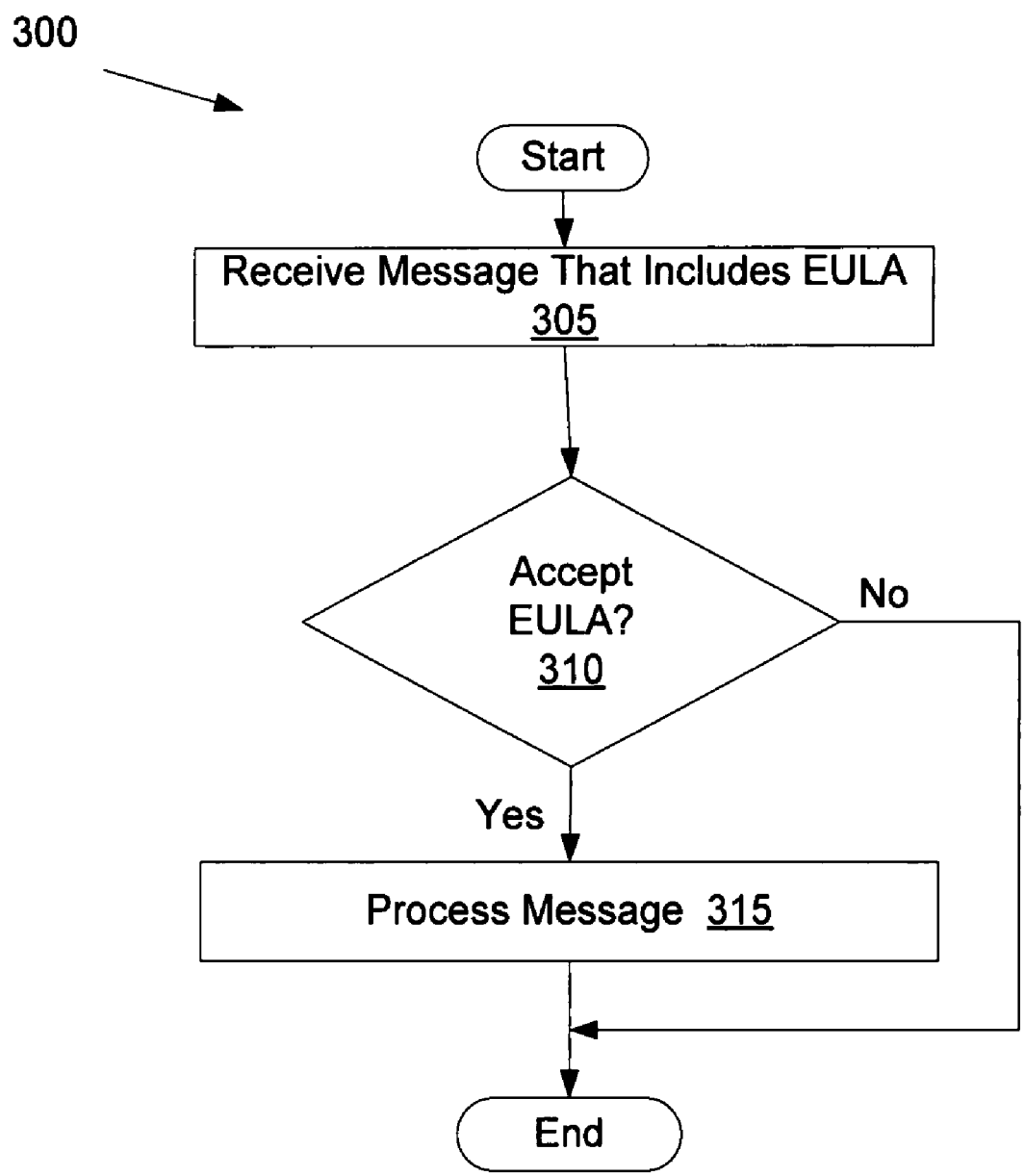
FIG. 3 illustrates a flow diagram of one embodiment for a method of processing a message associated with an end user license agreement.

FIG. 3 illustrates a flow diagram of one embodiment for a method 300 of processing a message associated with an end user license agreement (EULA). The method may be performed by processing logic that may comprise hardware (e.g., circuitry, dedicated logic, programmable logic, microcode, etc.), software (such as instructions run on a processing device), or a combination thereof. In one embodiment, method 300 is performed by client 110 of FIG. 1A or client 112 of FIG. 1B. In an alternative embodiment, method 300 is performed by a service or client of distributed computing system 200 of FIG. 2.

Referring to FIG. 3, method 300 includes processing logic receiving a message that includes a EULA (block 305). The message may be received by a client or service of a distributed computing system. At block 310, processing logic determines whether to accept the EULA. Such a determination may be made by processing one or more rules by a rules engine. In one embodiment, the determination of whether to accept the EULA is made automatically by comparing the EULA to a approved EULA list. In another embodiment, a user is prompted to choose whether to accept the EULA. If the EULA is accepted, the method proceeds to block 315, and the message is processed. If the EULA is not accepted, the method ends.

Figure 4:
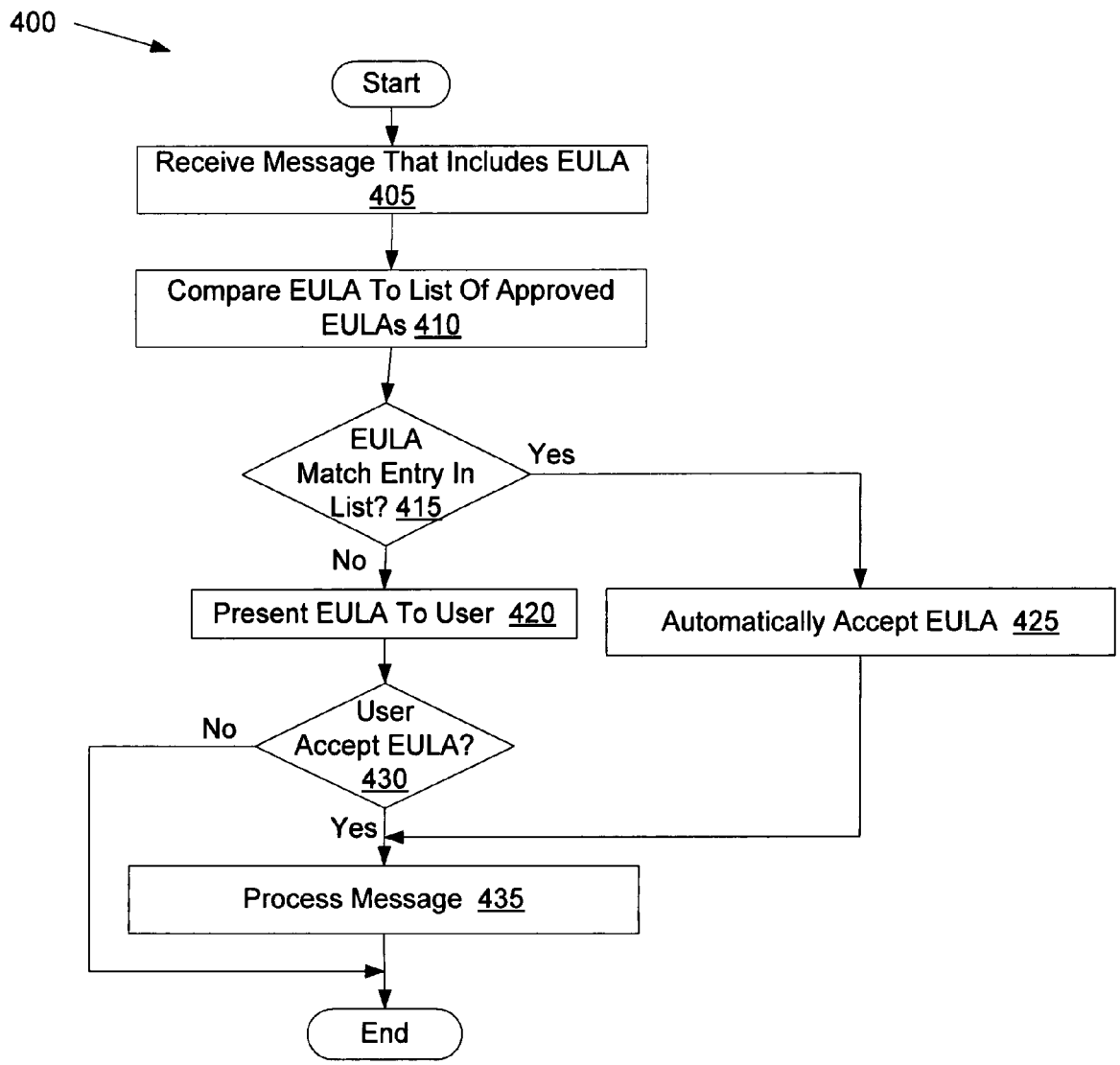
FIG. 4 illustrates a flow diagram of another embodiment for a method of processing a message associated with an end user license agreement.

FIG. 4 illustrates a flow diagram of another embodiment for a method 400 of processing a message associated with an end user license agreement (EULA). The method may be performed by processing logic that may comprise hardware (e.g., circuitry, dedicated logic, programmable logic, microcode, etc.), software (such as instructions run on a processing device), or a combination thereof. In one embodiment, method 400 is performed by client 110 of FIG. 1A or client 112 of FIG. 1B. In an alternative embodiment, method 400 is performed by a service or client of distributed computing system 200 of FIG. 2.

Referring to FIG. 4, method 400 includes processing logic receiving a message that includes a EULA (block 405). The message may be received by a client or service of a distributed computing system. At block 410, processing logic compares the EULA to a list of approved EULAs. The list may include entries that represent EULAs that have been approved by a legal department and/or EULAs that have previously been accepted by a user.

At block 415, if the received EULA matches an entry in the list of approved EULAs, the method proceeds to block 425. If the received EULA does not match any entries in the list of approved EULAs, the method proceeds to block 420.

At block 425, processing logic automatically accepts the EULA. The method then proceeds to block 435.

At block 420, processing logic presents the EULA to a user. The EULA may be presented to the user via a textual interface, graphical interface, etc. At block 430, processing logic determines whether the EULA has been accepted by the user. The user may accept or reject the EULA, for example, by using an input device to click on an accept or decline button presented in the user interface. If the user accepts the EULA, the method proceeds to block 435. If the user rejects the EULA, the method ends.

At block 435, the message is processed. The method then ends.

Figure 5A:
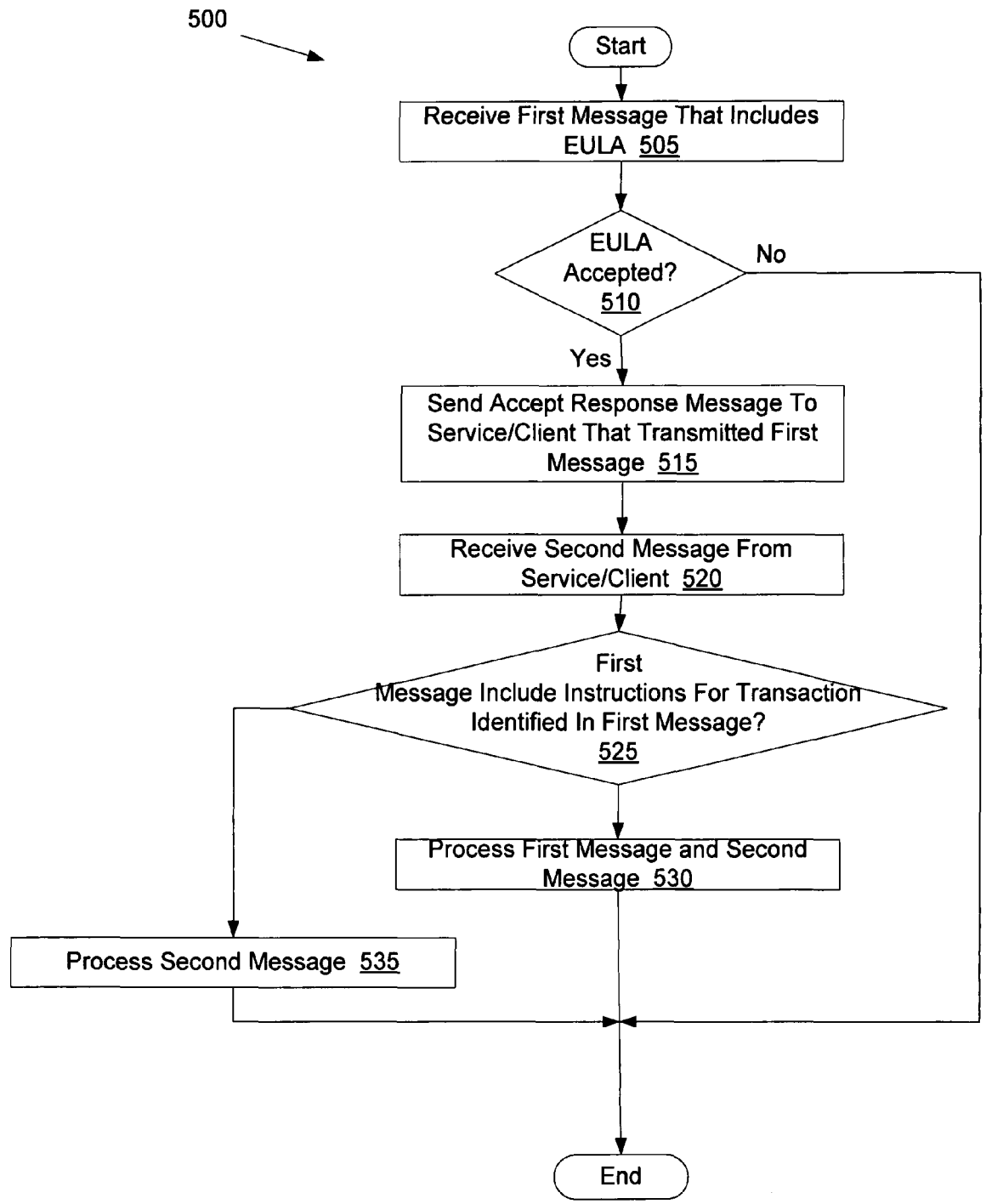
FIG. 5A illustrates a flow diagram of yet another embodiment for a method of processing a message associated with an end user license agreement.

FIG. 5A illustrates a flow diagram of yet another embodiment for a method 500 of processing a message associated with an end user license agreement (EULA). The method may be performed by processing logic that may comprise hardware (e.g., circuitry, dedicated logic, programmable logic, microcode, etc.), software (such as instructions run on a processing device), or a combination thereof. In one embodiment, method 500 is performed by client 110 of FIG. 1A or client 112 of FIG. 1B. In an alternative embodiment, method 500 is performed by a service or client of distributed computing system 200 of FIG. 2.

Referring to FIG. 5A, method 500 includes processing logic receiving a message that includes a EULA (block 505). The message may be received by a client or service of a distributed computing system. At block 510, processing logic determines whether to accept the EULA. Such a determination may be made by processing one or more rules by a rules engine. If the EULA is not accepted, the method ends. If the EULA is accepted, the method proceeds to block 515.

At block 515, processing logic sends an accept response message to a service or client that transmitted the first message. The accept response message notifies the service or client that sent the first message that the EULA associated with the first message has been accepted.

At block 520, processing logic receives a second message from the service or client that sent the first message. In one embodiment, the second message includes instructions for a transaction identified in the first message.

At block 525, processing logic determines whether the first message includes instructions for the transaction identified in the first message. For example, the first message may include instructions that, when added to instructions included in the second message, enable a transaction identified in the first message to be processed. Alternatively, the first message may not include any instructions for executing the transaction, in which the second message may include all such instructions. If the first message includes instructions for processing the transaction, the method proceeds to block 530. If the first message does not include instructions for processing the transaction, the method proceeds to block 535.

At block 530, both the first message and the second message are processed. In one embodiment, the first message and second message are processed together. In a further embodiment, the first message and second message are combined into a single message by processing logic, after which the combined message is processed. Alternatively, the first message and second message may be processed separately.

At block 535, the second message is processed. The method then ends.

Figure 5B:
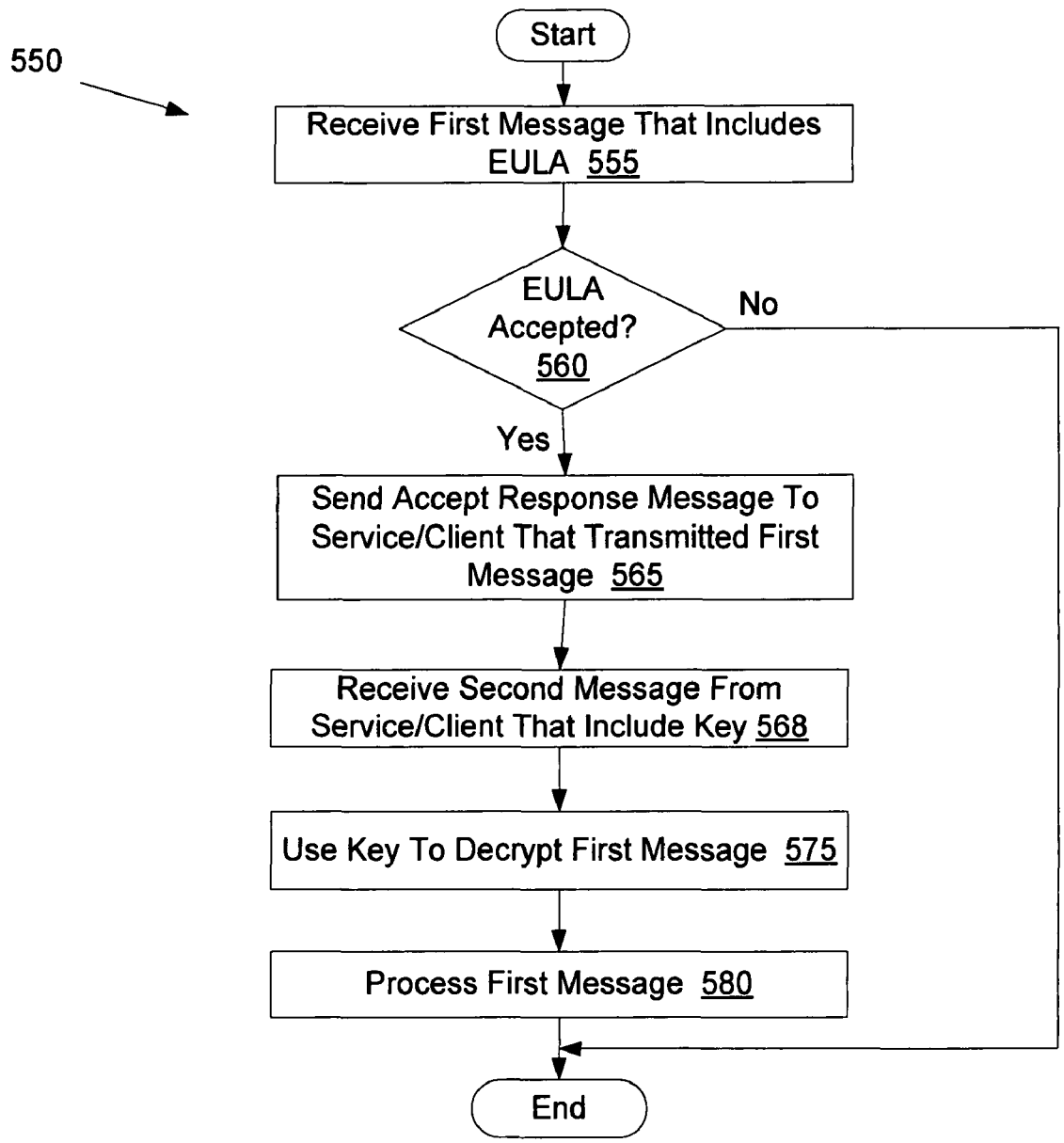
FIG. 5B illustrates a flow diagram of still yet another embodiment for a method of processing a message associated with an end user license agreement.

FIG. 5B illustrates a flow diagram of still yet another embodiment for a method 550 of processing a message associated with an end user license agreement (EULA). The method may be performed by processing logic that may comprise hardware (e.g., circuitry, dedicated logic, programmable logic, microcode, etc.), software (such as instructions run on a processing device), or a combination thereof. In one embodiment, method 550 is performed by client 110 of FIG. 1A or client 112 of FIG. 1B. In an alternative embodiment, method 550 is performed by a service or client of distributed computing system 200 of FIG. 2.

Referring to FIG. 5B, method 550 includes processing logic receiving an encrypted message that includes a EULA (block 555). At block 560, processing logic determines whether to accept the EULA. If the EULA is not accepted, the method ends. If the EULA is accepted, the method proceeds to block 565.

At block 565, processing logic sends an accept response message to a service (or client) that transmitted the first message. The accept response message notifies the service or client that sent the first message that the EULA associated with the first message has been accepted.

At block 568, processing logic receives a second message that includes an encryption key that was used to encrypt the first message. At block 575, processing logic uses the encryption key to decrypt the first message. At block 580, the first message is processed. The method then ends.

Figure 6:
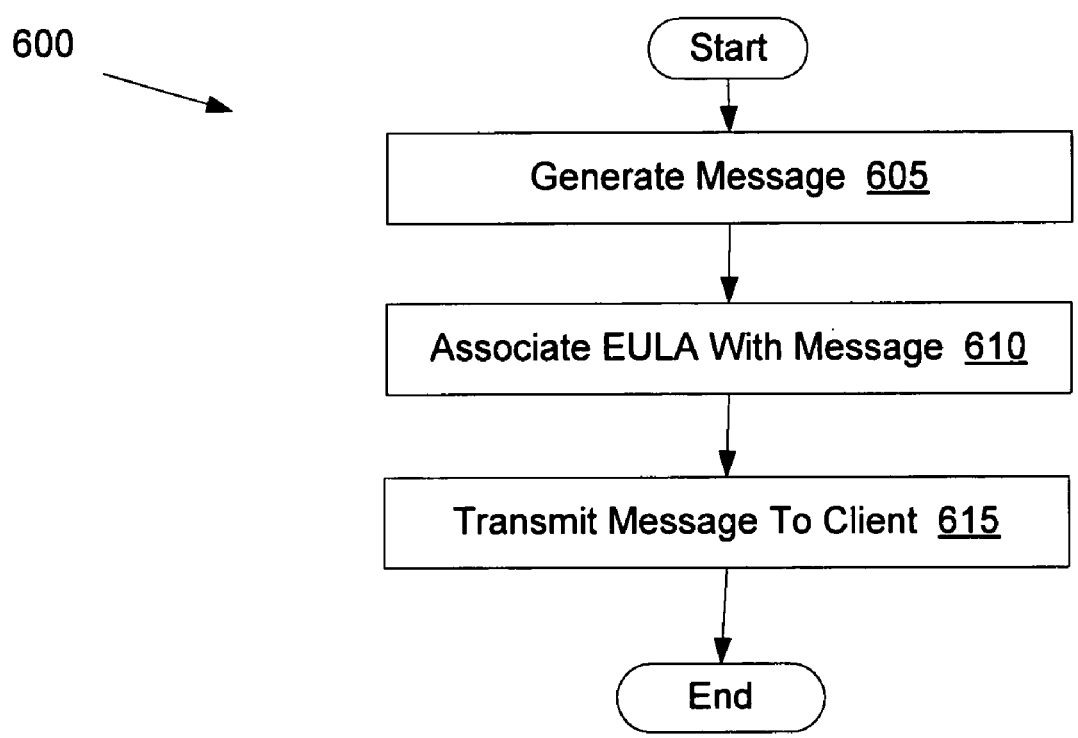
FIG. 6 illustrates a flow diagram of one embodiment for a method of associating an end user license agreement with a message.

FIG. 6 illustrates a flow diagram of one embodiment for a method 600 of associating an end user license agreement (EULA) with a message. The method may be performed by processing logic that may comprise hardware (e.g., circuitry, dedicated logic, programmable logic, microcode, etc.), software (such as instructions run on a processing device), or a combination thereof. In one embodiment, method 600 is performed by service 110 of FIG. 1A or client 112 of FIG. 1B. In an alternative embodiment, method 600 is performed by a service or client of distributed computing system 200 of FIG. 2.

Referring to FIG. 6, method 600 includes generating a message (block 605). At block 610, processing logic associates a EULA to the message. The EULA may be a EULA that has been generated for a specific client or service to which the message will be sent. Alternatively, the EULA may be a generic EULA that can be used for multiple different services and/or clients. Associating the EULA with the message may include, for example, attaching the EULA to the message, or inserting the EULA into a body of the message. At block 615, the message is transmitted to a client or service. The method then ends.

Figure 7:
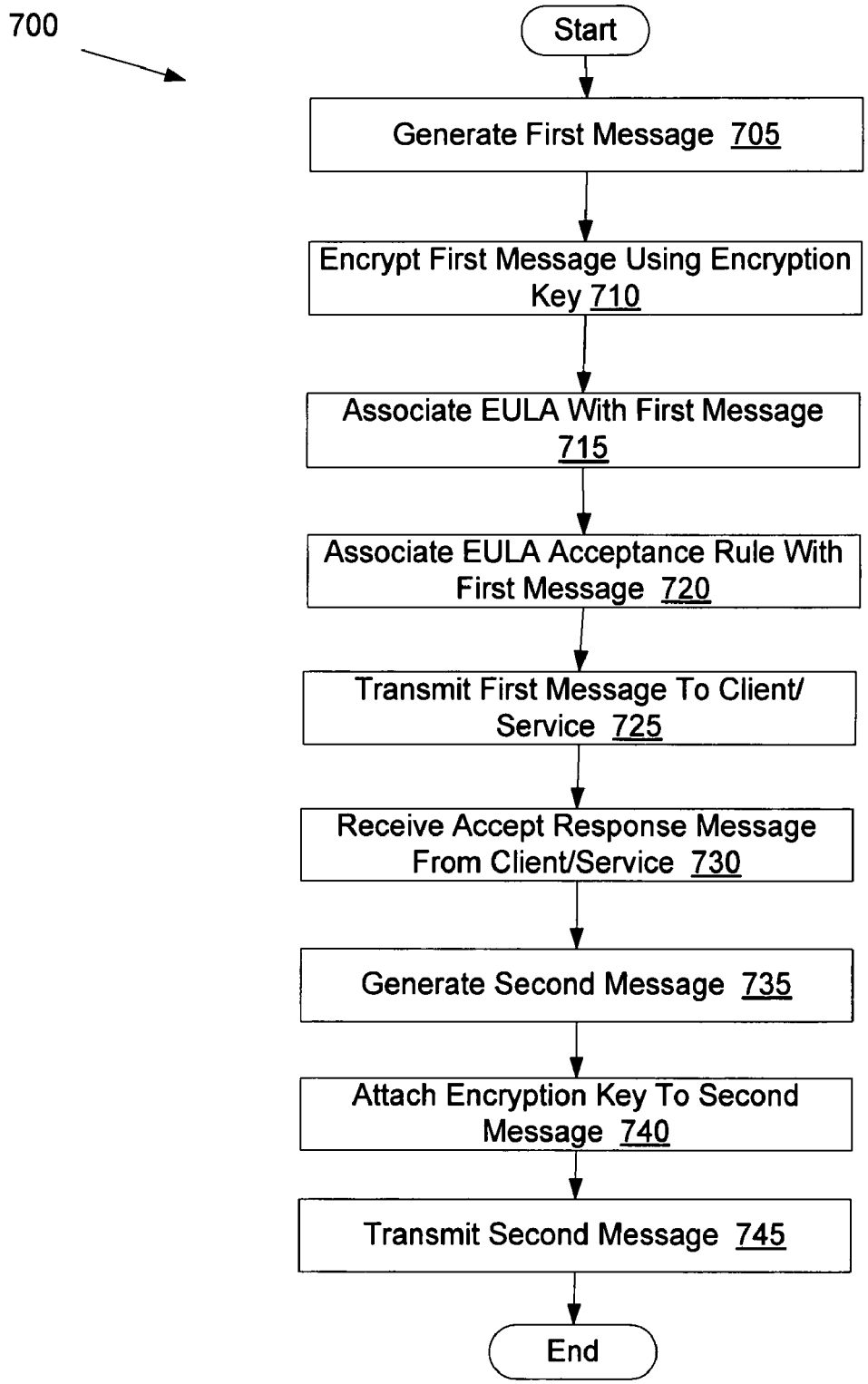
FIG. 7 illustrates a flow diagram of another embodiment for a method of associating an end user license agreement with a message.

FIG. 7 illustrates a flow diagram of another embodiment for a method 700 of associating an end user license agreement (EULA) with a message. The method may be performed by processing logic that may comprise hardware (e.g., circuitry, dedicated logic, programmable logic, microcode, etc.), software (such as instructions run on a processing device), or a combination thereof. In one embodiment, method 700 is performed by service 110 of FIG. 1A or client 112 of FIG. 1B. In an alternative embodiment, method 700 is performed by a service or client of distributed computing system 200 of FIG. 2.

Referring to FIG. 7, method 700 includes generating a first message (block 705). At block 710, processing logic encrypts the first message using an encryption key. At block 715, processing logic associates a EULA with the first message. At block 720, processing logic associates a EULA acceptance rule with the first message. Associating the EULA acceptance rule and the EULA with the first message may include, for example, attaching the EULA and/or the EULA acceptance rule to the first message, or inserting one or more of the EULA and the EULA acceptance rule into a body of the first message.

At block 725 the first message is transmitted to a client or service. At block 730, an accept response message is received from the client or service. The accept response message indicates that the EULA was accepted. In one embodiment, if the EULA is declined, a reject response message may be received, and the method may end.

At block 735 a second message is generated. At block 740 the encryption key that was used to encrypt the first message is attached to the second message. At block 745, the second message is transmitted to the client or service. The method then ends.

Figure 8:
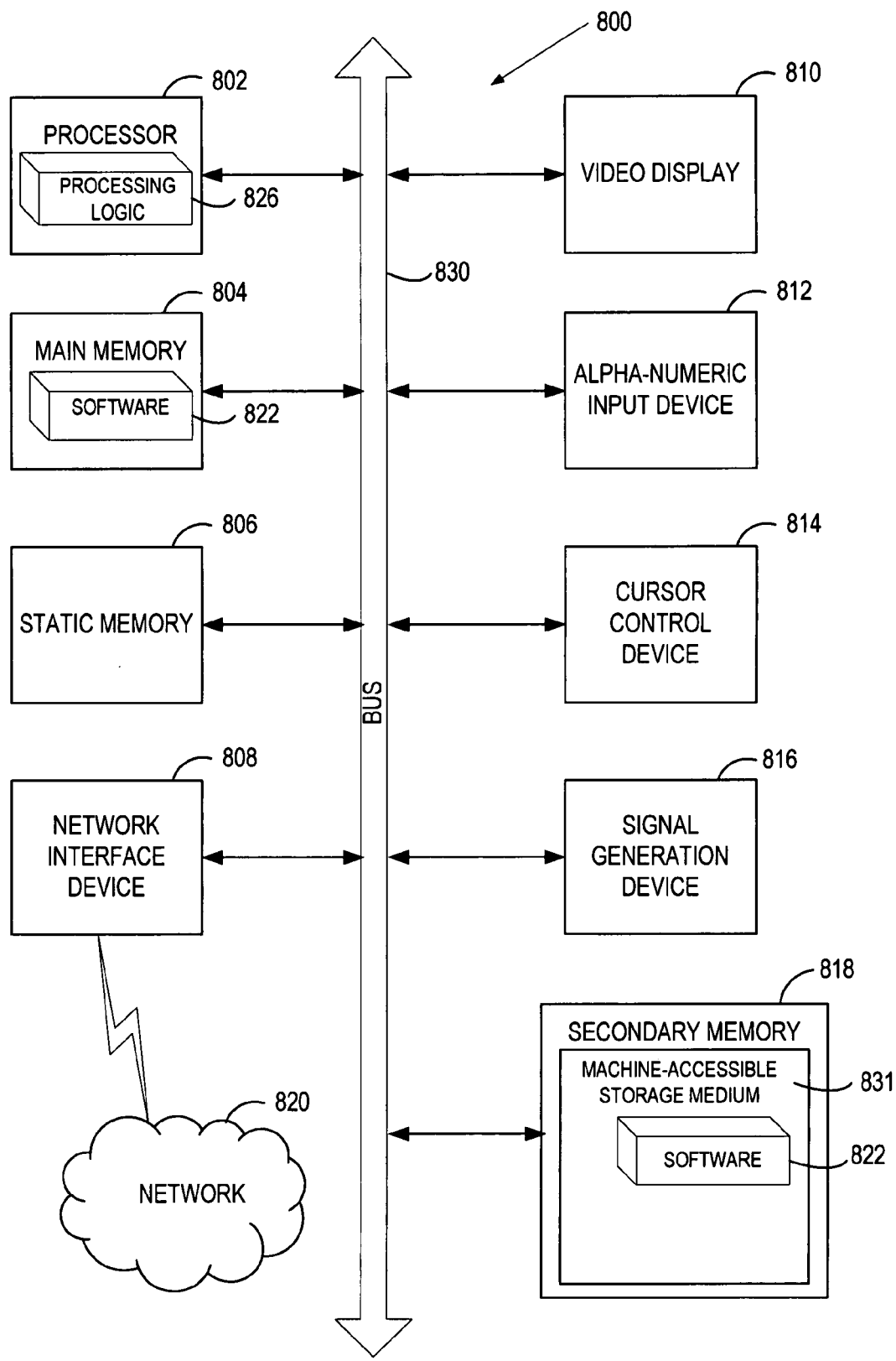
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-accessible storage media. The software 822 may further be transmitted or received over a network 820 via the network interface device 808.

The machine-accessible storage medium 831 may also be used to store data structure sets that define user identifying states and user preferences that define user profiles. Data structure sets and user profiles may also be stored in other sections of computer system 800, such as static memory 806.

While the machine-accessible storage medium 831 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
   receiving, at a client computing device executing a rules engine, a first message from a service provided by a server in a distributed computing system, the distributed computing system including the server, the client computing device and an enterprise service bus, wherein the enterprise service bus is an event-driven and standards-based messaging engine that links together services and clients, wherein the first message is associated with a transaction including the client computing device and the server, and wherein the first message includes an end user license agreement that dictates terms to be accepted by the client computing device before the client computing device utilizes the first message;
   identifying an end user license agreement acceptance rule associated with the first message;
   processing the identified end user license agreement acceptance rule by the client computing device to determine whether to automatically accept the end user license agreement without prompting a user for user input;
   automatically accepting the end user license agreement responsive to detecting that a first criterion specified for the end user license agreement acceptance rule is satisfied; and
   responsive to accepting the end user license agreement, sending an accept response message to the service, receiving a second message from the service, and processing the first message and the second message.

2. The method of claim 1, further comprising:
responsive to detecting that the first criterion is not satisfied, presenting the end user license agreement to a user of the client computing device via a graphical user interface; and
receiving an acceptance of the end user license agreement from the user via the user interface.

3. The method of claim 1, wherein determining whether to accept the end user license agreement comprises:
automatically comparing the end user license agreement to a list of approved end user license agreements; and
automatically accepting the end user license agreement responsive to determining that it matches an approved end user license agreement on the list.

4. The method of claim 1, wherein the identified end user license agreement acceptance rule indicates what actions to take in response to an acceptance of the end user license agreement, and what actions to take in response to a refusal of the end user license agreement.

5. The method of claim 1, wherein a portion of the first message is encrypted, and the second message includes an encryption key, further comprising:
using the encryption key to decrypt the encrypted portion of the first message.

6. The method of claim 1, wherein processing the second message causes a transaction identified in the first message to be executed.

7. The method of claim 1, further comprising:
automatically rejecting the end user license agreement responsive to detecting that a second criterion specified for the end user license agreement acceptance rule is satisfied, wherein the first message is not utilized by the client computing device.

8. A non-transitory machine-accessible storage medium including instructions that, when executed by a client computing device, cause the client computing device to perform a method comprising:
receiving, at the client computing device, a first message from a service provided by a server in a distributed computing system, the distributed computing system including the server, the client computing device and an enterprise service bus, wherein the enterprise service bus is an event-driven and standards-based messaging engine that links together services and clients, wherein the first message is associated with a transaction including the client computing device and the server, and wherein the first message includes an end user license agreement that dictates terms to be accepted by the client computing device before the client computing device utilizes the first message;
identifying an end user license agreement acceptance rule associated with the first message;
processing the identified end user license agreement acceptance rule by the client computing device to determine whether to automatically accept the end user license agreement without prompting a user for user input;
automatically accepting the end user license agreement responsive to detecting that a first criterion specified for the end user license agreement acceptance rule is satisfied; and
responsive to accepting the end user license agreement, sending an accept response message to the service, receiving a second message from the service, and processing the first message and the second message.

9. The non-transitory machine-accessible storage medium of claim 8, the method further comprising:
responsive to detecting that the first criterion is not satisfied, presenting the end user license agreement to a user of the client computing device via a graphical user interface; and
receiving an acceptance of the end user license agreement from the user via the user interface.

10. The non-transitory machine-accessible storage medium of claim 8, wherein determining whether to accept the end user license agreement comprises:
automatically comparing the end user license agreement to a list of approved end user license agreements; and
automatically accepting the end user license agreement responsive to determining that it matches an approved end user license agreement on the list.

11. The non-transitory machine-accessible storage medium of claim 8, wherein the identified end user license agreement acceptance rule indicates what actions to take in response to an acceptance of the end user license agreement, and what actions to take in response to a refusal of the end user license agreement.

12. The non-transitory machine-accessible storage medium of claim 8, wherein a portion of the first message is encrypted, and the second message includes an encryption key, the method further comprising:
using the encryption key to decrypt the encrypted portion of the first message.

13. The non-transitory machine-accessible storage medium of claim 8, wherein processing the second message causes a transaction identified in the first message to be executed.

14. The non-transitory machine-accessible storage medium of claim 8, the method further comprising:
automatically rejecting the end user license agreement responsive to detecting that a second criterion specified for the end user license agreement acceptance rule is satisfied, wherein the first message is not utilized by the client computing device.

15. A client computing device comprising:
a memory; and
a processor coupled to the memory, the processor to:
receive a first message from a service provided by a server in a distributed computing system, the distributed computing system including the server, the client computing device and an enterprise service bus, wherein the enterprise service bus is an event-driven and standards-based messaging engine that links together services and clients, wherein the first message is associated with a transaction including the client computing device and the server, and wherein the first message includes an end user license agreement that dictates terms to be accepted by the client computing device before the client computing device utilizes the first message;
identify an end user license agreement acceptance rule associated with the first message;
process the identified end user license agreement acceptance rule to determine whether to automatically accept the end user license agreement without prompting a user for user input;
automatically accept the end user license agreement responsive to detecting that a first criterion specified for the end user license agreement acceptance rule is satisfied; and
responsive to accepting the end user license agreement, send an accept response message to the service, receive a second message from the service, and process the first message and the second message.

16. The computing device of claim 15, wherein the processor is further to:
 present the end user license agreement to a user of the client computing device via a graphical user interface responsive to detecting that the first criterion is not satisfied; and
 receive an acceptance of the end user license agreement from the user via the user interface.

17. The computing device of claim 15, wherein determining whether to accept the end user license agreement comprises:
 automatically comparing the end user license agreement to a list of approved end user license agreements; and
 automatically accepting the end user license agreement responsive to determining that it matches an approved end user license agreement on the list.

18. The computing device of claim 15, wherein the identified end user license agreement acceptance rule indicates what actions to take in response to an acceptance of the end user license agreement, and what actions to take in response to a refusal of the end user license agreement.

19. The computing device of claim 15, the processor further to:
 automatically reject the end user license agreement responsive to detecting that a second criterion specified for the end user license agreement acceptance rule is satisfied, wherein the first message is not utilized by the client computing device.

20. The computing device of claim 15, wherein a portion of the first message is encrypted, and the second message includes an encryption key, the processor further to:
 use the encryption key to decrypt the encrypted portion of the first message.

21. The computing device of claim 15, wherein processing the second message causes a transaction identified in the first message to be executed.

* * * * *